United States Patent [19]
Iijima et al.

[11] 3,819,948
[45] June 25, 1974

[54] METHOD AND APPARATUS FOR CONTROLLING THE QUANTITY OF OIL COATED ON CONTINUOUSLY MOVING MATERIAL

[75] Inventors: Hiroshi Iijima, Yokohama; Kinya Inamoto, Kawasaki; Shuzo Fukuda, Yokohama; Takashi Shimoma, Yokohama; Tsuneharu Miyachi, Yokohama, all of Japan

[73] Assignee: Nippon Kakan Kubushiki Kaisha, Tokyo, Japan

[22] Filed: Mar. 15, 1973

[21] Appl. No.: 341,580

[30] Foreign Application Priority Data
Apr. 21, 1972 Japan................................ 47-39557

[52] U.S. Cl................ 250/559, 250/225, 356/161, 118/9
[51] Int. Cl........................................... G01b 11/00
[58] Field of Search.................... 356/118, 119, 161; 250/219 TH, 225, 573, 574, 564, 565; 118/9, 70; 117/93.4 R, 107

[56] References Cited
UNITED STATES PATENTS

| 3,158,675 | 11/1964 | Murray et al................. 250/219 TH |
| 3,185,024 | 5/1965 | McCreanor et al. ...... 250/219 TH X |
| 3,446,977 | 5/1969 | Batesoxi.......................... 250/225 X |
| 3,502,888 | 3/1970 | Stites.............................. 356/118 X |

Primary Examiner—Walter Stolwein
Attorney, Agent, or Firm—Flynn & Frishauf

[57] ABSTRACT

A pair of optical systems are provided along the path of travel of the material at positions before and after oiling. Each optical system comprises a polarized light projector and a receiver for receiving the polarized light reflected from the oil film coated on the material. By comparing the outputs of two receivers, the thickness of the oil film can be determined. To automatically control the quantity of the oil to be coated on the material, the difference between the outputs of the two receivers at different or the same azimuth angles of the optical axes of the two receivers is detected and this difference is used to control the operating condition of an electrostatic oiling device.

15 Claims, 6 Drawing Figures

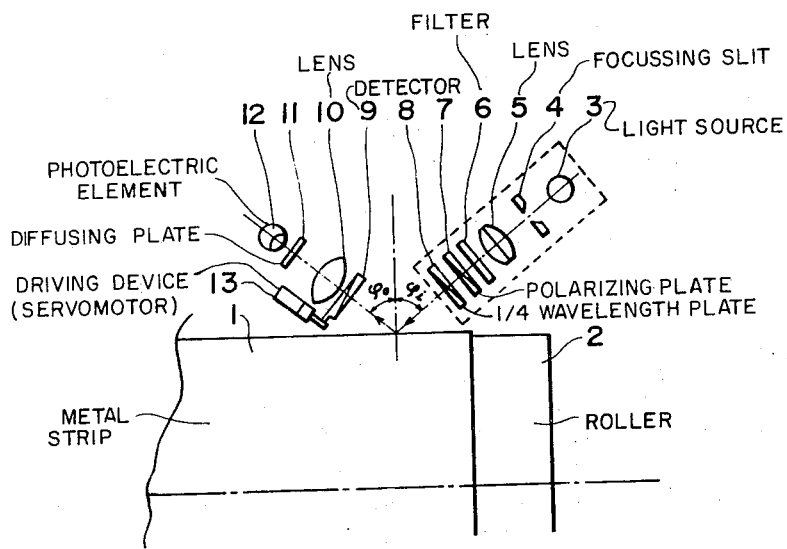
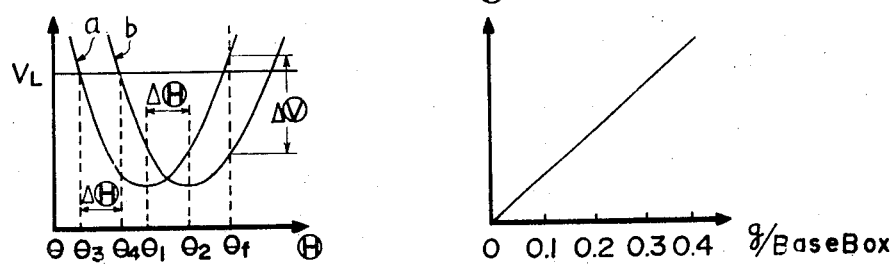
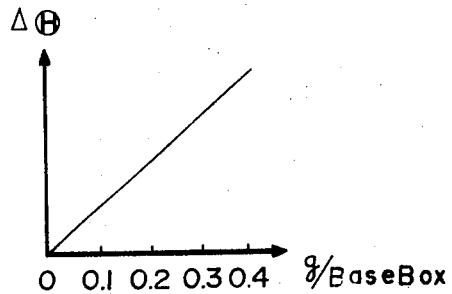
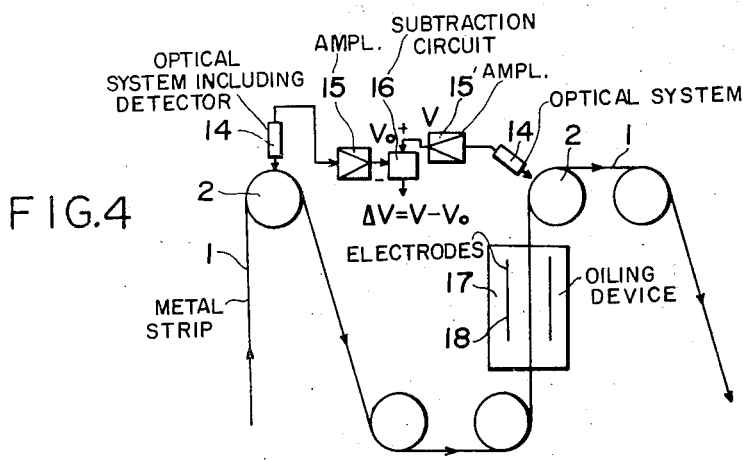

METHOD AND APPARATUS FOR CONTROLLING THE QUANTITY OF OIL COATED ON CONTINUOUSLY MOVING MATERIAL

BACKGROUND OF THE INVENTION

This invention relates to a method and apparatus for automatically controlling the quantity of oil coated on moving metal strips.

Various metal products, for example tinned steel sheet, are coated with thin films of oil for the purpose of easy handling and for preventing scratches, and rusting. The quantity and uniformity of the oil films have a great influence upon the secondary working of the oiled strips such as painting or printing. For this reason, it is highly desirable to always maintain the quantity of oil applied at a definite value. However, the quantity of the oil is generally very small, for example about 25 to 80 Angstrom units in terms of film thickness, so that it is difficult to accurately measure the thickness of the oil film. Known methods of measuring the quantity of oil are limited to the sampling type utilizing a hydrofil balance or a Soxhlet extracting method. Each of these pin methods cannot accurately measure the quantity of the oil applied because it is impossible to continuously measure the oil quantity applied on a metal strip running at a high speed of the order of from 200 to 400 meters per minute, or because it is necessary to sample the oil by stopping the processing line or it is impossible to sample the oil at a constant line speed. For this reason, it has been impossible to produce strips coated with oil films of uniform thickness.

Although a method of utilizing absorption of infrared rays has been proposed for the continuous measurement of the quantity of the oil coated on a metal strip, such method has not been commercialized. As far as the applicant is aware, there has been no successful method of continuous measurement of the quantity of oil and no automatic control of the quantity of oil which is operated in accordance with the result of such measurement.

Accordingly, it is an object of this invention to provide a novel method of continuously measuring the quantity of the oil applied on a metal strip running at a high speed by measuring the light reflected from the oil film on the metal strip by means of a polarized light system and a method of automatically controlling the quantity of the oil being applied in response to the result of measurement.

Another object of this invention is to provide a novel method and apparatus for continuously measuring the quantity of the oil applied to a running metal strip by using a measuring device including a polarized light optical system, said measuring device operating to continuously control the quantity of the oil being applied in response to the difference in the azimuth angles of the optical axes of the polarized light optical system when the quantities of the lights reflected from the oil film measured by the measuring device before and after oiling reach predetermined minimum values or become equal with each other.

Still another object of this invention is to provide a novel control device for controlling the operating condition of an electrostatic oiling device in accordance with the measured thickness of the oil film coated on a continuously moving strip of metal.

SUMMARY OF THE INVENTION

According to one aspect of this invention, there is provided a method of controlling the quantity of oil coated on a continuously moving material comprising the steps of projecting polarized lights by a pair of polarized light optical systems on the surface of the material at discrete positions before and after oiling, receiving the polarized lights reflected from the surface of the material by means of polarized light receivers at the discrete positions, varying the azimuth angles of the optical axes of the receivers for detecting the variations in the quantities of the lights received at corresponding azimuth angles before and after oiling, comparing the detected variations to produce a difference signal, and controlling the operating condition of an oiling device for the material in accordance with the difference signal so as to apply a predetermined quantity of the oil onto the material.

According to another aspect of this invention, there is provided apparatus for controlling an oiling device for coating oil onto continuously moving material comprising a pair of optical systems positioned along the path of the material at positions before and after oiling; each optical system including a projector for projecting polarized light upon the surface of the material, a polarized light receiver for receiving the polarized light reflected from the surface of the material, drive means for driving the receiver so as to vary the azimuth angle of the optical axis of the polarized light receiver, and means for detecting the azimuth angle of the optical system; means responsive to the outputs from the receivers for controlling the drive means; subtractor means for deriving a difference signal between the outputs from the receivers; a comparator for comparing the difference signal with a predetermined reference signal; and means responsive to the output from the comparator for controlling the quantity of the oil coated on the material by the oiling device.

BRIEF DESCRIPTION OF THE DRAWINGS

FIG. 1 is a diagrammatic representation of the polarized light optical system utilized in the novel measuring device embodying the invention;

FIG. 2 is a graph of the polarized light showing the result of measurement obtained by the optical detector wherein the abscissa shows the azimuth angle of the optical axis of the polarized light element of the optical detector and the ordinate the quantity of light detected;

FIG. 3 is a graph showing the relationship between the difference in the azimuth angles of the optical axes which gives a minimum quantity of the light received by the detector before and after oiling, and the quantity of the oil coated on a metal strip;

FIG. 4 is a diagrammatic representation of the novel measuring device which measures the quantity of the oil coated in terms of the difference in the quantities of lights detected before and after oiling;

DESCRIPTION OF THE PREFERRED EMBODIMENT

Figure 5:
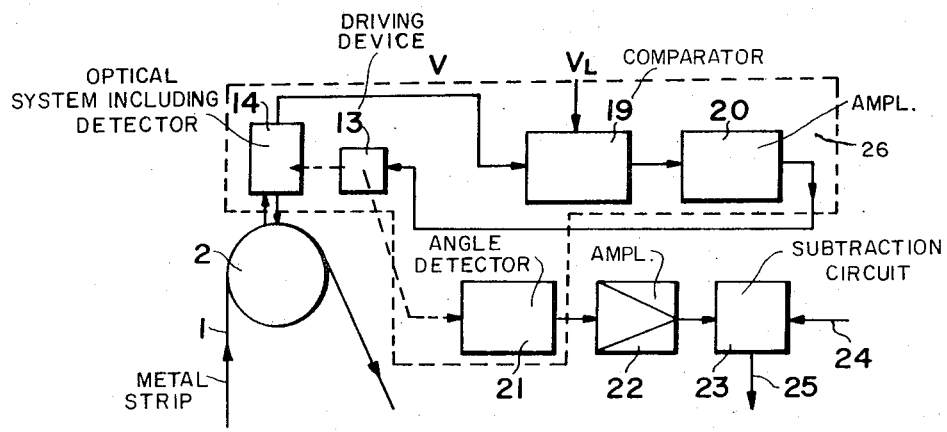
FIG. 5 is a block diagram showing a measuring device for continuously measuring the quantity of the oil applied in terms of the difference in the azimuth angles of the optical axis of a detector before and after oiling, the figure being depicted to show mainly the apparatus for measuring the quantity of the oil after it has been coated.

FIG. 1 of the accompanying drawing diagrammatically shows the optical detector of the novel measuring device wherein polarized light is projected upon the surface of an article, for example a metal strip, coated with a thin film of oil and the light reflected by the oil film is detected by a detector for producing a signal proportional to the quantity of the light received. Such detection is made at two discrete positions before and after oiling for the purpose of preventing such surface conditions of the strip as the surface luster, ruggedness, or the quantity of the metal plated from affecting the result of measurement, thereby enabling accurate measurement of only the quantity of the oil coated on the strip.

In FIG. 1, an oiled article, for example a tinned steel strip 1, is moved at a high speed on rollers 2. On a roller which is used to change the direction of movement of the strip in a high speed continuous processing line, the wobbling of the running strip is extremly small so that it is advantageous to install the optical measuring device at such position. The polarized light projector of the measuring device shown in FIG. 1 comprises a light source 3, for example a tungsten lamp, a slit 4 for focussing the light from the light source 3, a collimator lens 5, a filter 6 such as a silver interference filter having a center wave length of 5900 A and adapted to limit the wavelength of the filtered light to a suitable range, a polarizing plate 7 such as a "Polaroid" plate, and a quarter wavelength plate 8. The projector functions to convert the light from light source 3 into polarized light by the action of a polarizing element comprised of the polarizing plate 7 and the quarter wavelength plate 8 and to project the polarized light upon the strip 1 coated with oil. The optical receiver for receiving the light reflected by the oil film on the strip comprises a light analyzer or detector 9 (the terms "analyzer" and "detector" are used interchangeably for element 9) in the form of a polarizing plate 9 such as a "Polaroid" plate, a condenser lens 10, a diffusing plate 11 such as a water white glass plate and a photoelectric element 12 such as a phototransistor, a photocell or a photoelectric multiplier. In the embodiment shown in FIG. 1, the light analyzer or detector 9 is rotated by a driving device such as a servomotor 13 so as to vary the azimuth angle of the optical axis of the polarized light optical system of the light receiver. In the optical detector apparatus described above, the light projector and the light receiver are arranged such that the incidence angle $\phi i$ and the reflection angle $\phi o$ are equal, that is $\phi i = \phi o = 55°$.

Polarized light characteristic curves shown in FIG. 2 shown the variation in the quantity of light received by photoelectric element 12 when the azimuth angle $\Theta$ of the optical axis of the light detector 9 of the receiver is rotated by servomotor 13 while the azimuth angle of the optical angle of the polarizing element of the light projector shown in FIG. 1 comprised of the polarizing plate 7 and the quarter wavelength plate 8 is maintained fixed. Curve $a$ shows the variation in the quantity of light received before oiling whereas curve $b$ that of the quantity of the light received after oiling. In FIG. 2, the abscissa shows the azimuth angle $\Theta$ of the optical system of the light receiving element 9 and the ordinate the electrical output V of the photoelectric element 12.

As shown in FIG. 2, where the azimuth angle $\Theta$ of the optical axis of the light detector 9 shown in FIG. 1 is varied continuously, the output V of the photoelectric element 12 which receives the polarized light reflected by the surface of the oil film varies along a curve similar to a curve of a secondary function so that the output V becomes minimum at a certain azimuth angle of the optical axis. Curves $a$ and $b$ representing the variation in the output V before and after oiling are substantially identical. Accordingly, there is a difference between curves $a$ and $b$ which is proportional to the quantity of the oil coated on the strip. In the illustrated example, this difference is shown as the difference $\Delta\Theta$ between azimuth angles $\theta_1$ and $\theta_2$ of the optical axis of the light detector 9 which gives the minimum output V. In other words, there is a definite proportional relation between the quantity of the oil coated and the difference $\Delta\Theta$ as shown in FIG. 3. For this reason, it is possible to know the quantity of the oil coated at the position of measurement by measuring the difference $\Delta\Theta$.

$V_L$ shown in FIG. 2 represents a reference quantity of the light received which is selected independently of the minimum output. The difference $\Delta\Theta'$ between azimuth angles $\theta_3$ and $\theta_4$ of the optical axis of the light detector 9 at cross-points between $V_L$ and curves $a$ and $b$, respectively, is substantially equal to $\Delta\Theta$ since curves $a$ and $b$ are substantially identical as has been pointed out hereinbefore. Accordingly, it is possible to measure the quantity of the oil coated by using $\Delta\Theta'$ instead of $\Delta\Theta$.

It is also possible to measure the quantity of the oil coated by fixing the azimuth angle of the optical axis of the light detector 9 to a suitable angle $\theta_f$ for the measurements for both before and after oiling and then measuring the difference $\Delta V$ in the outputs of both measurements. This is possible because curves $a$ and $b$ are substantially identical so that $\Delta V$ is proportional to $\Delta\Theta$ or $\Delta\Theta'$.

As above described, the invention contemplates a novel method and apparatus for continuously measuring the quantity of the oil coated on a continuously running metal strip whereby to control the quantity of the oil being coated by an oiling device in accordance with the result of such measurement.

FIG. 4 is a block diagram showing the detector of a measuring device which measures continuously the quantity of the oil coated on the strip by measuring the difference $\Delta V$ of the output, and a signal processing system. As shown in FIG. 4, the metal strip 1 to be oiled is passed around rollers 2 to pass through a processing line including an oiling device 17. In FIG. 4, the optical systems generally designated by reference numerals 14, 14' and each including the projector and receiver shown in FIG. 1 are associated with respective rollers 2 and 2' to project the polarized light upon the strip before and after oiling. The azimuth angles of the optical axes of the light receivers 9 of the optical systems 14, 14' are made to be equal and the light receivers 9 are then fixed to the adjusted positions. This is easily accomplished for example by receiving a "standard" light signal and adjusting the angular position (i.e., azimuth angle) of a receiver 9 by energizing, for example a servomotor 13, until a desired value output is obtained. The outputs from both systems 14, 14' are applied to a subtraction circuit 16 respectively through amplifiers 15, 15'. Subtraction circuit 16 operates to produce a signal corresponding to difference $\Delta V$ shown in FIG. 2 between outputs $V_o$ and V of two detectors of systems 14, 14' which measure the quantities of the reflected light before and after oiling. As above described, difference $\Delta V$ represents the measured quantity of the oil coated on the strip so that it is possible to use $\Delta V$ as a control signal for controlling the quantity of the oil to be coated. In the example shown in FIG. 4, the oiling device comprises an electrostatic coating device including a pair of electrodes 18 positioned on the opposite sides of the strip 1.

FIG. 5 is a block diagram showing a detector of a measuring device which is designed to continuously measure the quantity of the oil coated on the strip by measuring above described difference $\Delta\theta$ in the azimuth angles, and a signal processing system. For the sake of simplicity, the measuring device for measuring the reflected light before oiling is not shown.

In FIG. 5, 1 designates a metal strip passed around a roller 2 and 14 an optical system including a detector having the same construction as that shown in FIG. 1. Again, 13 shows a driving device such as a servomotor for rotating the light receiver 9 of the optical detector 14. The output V from the optical detector 14 is compared with a predetermined reference value $V_L$ in a comparator 19, preferably in the form of a level discriminating circuit, which provides the difference between $V_L$ and V. This difference signal is amplified by a power amplifier 20 and then supplied to servomotor 13. Thus, servomotor 13 is controlled such that the output V from optical detector 14 is always equal to the reference value $V_L$. Two optical detectors 14, 14' (detector 14' not shown in FIG. 5), continuously produce a difference ($\Delta\theta = |\theta_3 - \theta_4|$, in FIG. 2) between the azimuth angles of the optical axes of their light detectors 9, the measured difference representing the quantity of the oil coated. The azimuth angle of the optical axis is detected by an angle detector 21 which may be a potentiometer or an angle encoder or the like which produces an electrical output. This output is applied to a subtraction circuit 23 through an amplifier 22. Like the subtractor shown in FIG. 4, subtractor 23 compares the amplified output with an input 24 from optical detector 14' (not shown in FIG. 5) which receives light from the sheet after oiling for producing a difference signal $\Delta\theta'$ which is proportional to the quantity of the oil coated on the strip.

Although, more or less complicated, by constructing the control system for the servomotor 13 which includes the comparator (level discriminator) 19 and power amplifier 20 such that the control system causes the light detector to follow up a particular azimuth angle which gives a minimum output such as $\theta_1$ or $\theta_2$ shown in FIG. 2, it is possible to detect $\Delta\theta$ in FIG. 2, thus providing accurate measurements.

Although in the foregoing description, the light receiver 9 of the optical detector was rotated to vary the azimuth angle of its optical axis, it will be clear that the same object can be accomplished by rotating one of the three elements of the optical detector which contribute to polarization, that is polarizing plate 7, quarter wavelength plate 8 and light detector 9 while maintaining other two elements fixed at suitable azimuth angles. Which one of the elements is to be rotated is determined by the practical design.

The signal provided by the measuring device shown in FIG. 4 or 5 and proportional to the quantity of the oil coated is used in the automatic control of the quantity of the oil being coated in the following manner.

Figure 6:
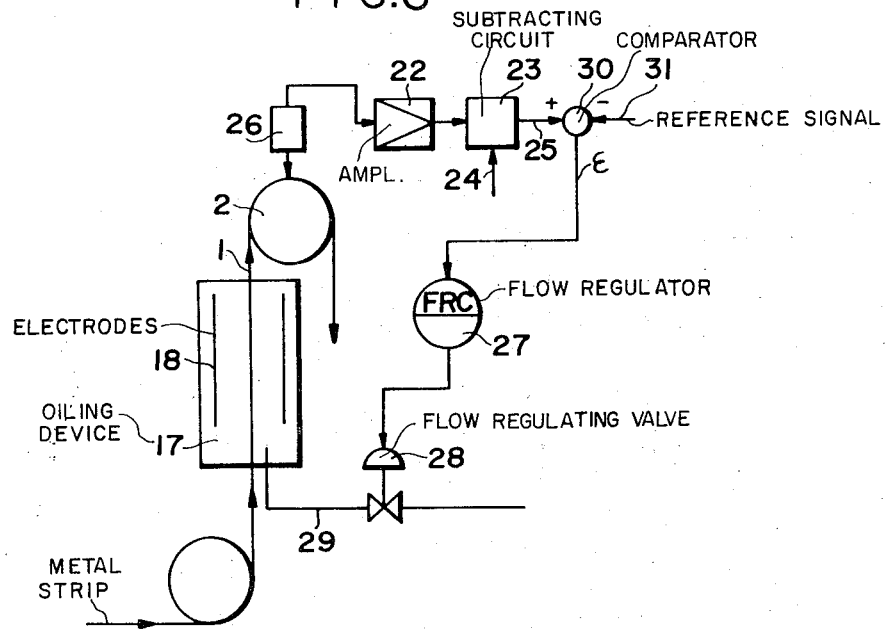
FIG. 6 shows a block diagram of a control system which controls continuously the quantity of the oil being applied in accordance with the result of measurement obtained by the measuring device shown in FIG. 5.

FIG. 6 is a block diagram of one example of such an automatic control system wherein the oil is coated on the surface of a metal strip by means of an electrostatic oiling device including electrodes 18. In this embodiment, the measurement of the oil quantity is done by the measuring device shown in FIG. 5. Component elements shown in FIG. 5 and bounded by dotted lines are designated generally by a reference numeral 26. In FIG. 6, the signal representing the quantity of the oil coated on the strip is applied to one input of a subtracting circuit 23 through amplifier 22 whereas the signal 24 produced by a detector which receives the light reflected by the strip before oiling is applied to the other input of the subtracting circuit 23. An output signal 25 from subtracting circuit 23 corresponding to the difference between the two inputs is compared in comparator 30 with a reference signal 31 representing the desired oil quantity, whereby a difference signal $\epsilon$ is applied to a flow quantity regulator 27 which operates to control a flow regulating valve 28 in accordance with the difference signal $\epsilon$ thus regulating the quantity of atomized oil particles supplied to the space between the electrodes 18 of the electrostatic oiling device 17 through a conduit 29. Thus, in this embodiment, the quantity of the oil being coated on the surface of the strip is controlled by varying the quantity of the atomized oil flowing through conduit 29.

Instead of regulating the flow quantity of the atomized oil as above described, the flow quantity of the oil being coated can also be controlled by mechanically or electrically controlling the oiling conditions such as the voltage impressed across the electrodes 18. The novel control system is also applicable to other oiling devices than that illustrated.

As above described, with the novel measuring device as it is possible to accurately measure the quantity of the oil applied onto a continuous material running at a high speed through a processing line, it is not necessary to temporarily stop the material for the purpose of sampling oil as in the prior art. Moreover, since it is possible to apply a correct quantity of oil to the material while it is running at the prescribed speed, it is not only possible to apply an oil film of uniform thickness but also to improve working efficiency. Automatic control of the oil quantity being coated saves labour, thus reducing production cost.

The novel measuring device and control system can also be applied to the measurement and automatic control of the thickness of films formed on tin free steel strips by chemical treatment.

While the invention has been shown and described in terms of its preferred embodiments, it will be clear that the invention is by no means limited to these illustrated embodiments and that many changes and modifications will be obvious to one skilled in the art without departing from the true spirit and scope of the invention as defined in the appended claims.

What is claimed is:

1. A method of continuously controlling the quantity of oil coated on a continuously moving material comprising the steps of:
   projecting respective polarized lights by means of a pair of polarized light optical systems on the surface of said material at discrete positions before and after oiling;
   receiving the polarized lights reflected from the surface of said material by means of respective polarized light receivers at said discrete positions;
   varying the azimuth angles of the optical axes of said respective polarized light receivers;
   continuously detecting the variations in the quantities of the lights received at corresponding azimuth angles before and after oiling;
   comparing the detected variations to produce a difference signal; and
   continuously controlling the operating condition of an oiling device for said material as a function of said difference signal so as to apply a predetermined quantity of the oil onto said material.

2. The method according to claim 1 wherein the azimuth angles of the optical axes of said two polarized light receivers which correspond to minimum quantities of the lights received before and after oiling are detected, said detected azimuth angles are compared and a difference signal corresponding to the difference between said detected azimuth angles is produced, said difference signal being used in said controlling step to control said oiling device.

3. The method according to claim 1 wherein the azimuth angles of the optical axes of said two polarized light receivers at which the quantities of the lights received before and after oiling coincide with a predetermined reference value are detected, said detected azimuth angles are compared and a difference signal corresponding to the difference between said detected azimuth angles is produced, said difference signal being used in said controlling step to control said oiling device.

4. The method according to claim 1 wherein the azimuth angles of the optical axes of said two polarized light receivers are made equal with each other, corresponding quantities of the lights received before and after oiling are detected, and the detected light quantities are compared to produce a difference signal, said difference signal being utilized in said controlling step to control said oiling device.

5. The method according to claim 2 wherein either one of the polarizing elements of the two polarized light receivers is rotated such that the corresponding quantities of the lights received before and after oiling are always made minimum while the other element is held fixed, and the angle of rotation of rotated element is measured and compared with the fixed azimuth angle of said other element to produce said difference signal, said difference signal being utilized to control said oiling device.

6. The method according to claim 3 wherein either one of the polarizing elements of the two polarized light receivers is rotated such that the corresponding quantities of the lights received before and after oiling are always equal to a predetermined quantity while the other element is held fixed, and the angle of rotation of the rotated element is detected and compared with the fixed azimuth angle of said other element to produce said difference signal, said difference signal being used to control said oiling device.

7. Apparatus for controlling an oiling device for coating oil onto continuously moving material comprising:

a pair of optical systems respectively positioned along the path of said material at positions before and after oiling, each of said optical systems including a projector for projecting polarized light upon the surface of said material, a polarized light receiver for receiving the polarized light reflected from the surface of said material, means for varying the azimuth angle of the optical axis of said polarized light receiver, and means for detecting said azimuth angle of the optical system;
   means responsive to the outputs from said polarized light receivers for controlling said azimuth angle varying means;
   subtractor means for continuously deriving a difference signal corresponding to the difference between outputs from said polarized light receivers;
   a comparator for comprising said difference signal with a predetermined reference signal; and
   oil quantity control means responsive to the output from said comparator for continuously controlling the quantity of the oil coated on said material by said oiling device.

8. The apparatus according to claim 7 wherein said means responsive to the outputs from said polarized light receivers comprises means responsive to the difference in the quantities of the polarized lights received by said receivers.

9. The apparatus according to claim 7 wherein said means responsive to the outputs from said polarized light receivers comprises means responsive to the difference between the azimuth angles of the optical axes of said polarized light receivers.

10. The apparatus according to claim 7 wherein: said means for controlling said azimuth angle varying means comprises a servo-system responsive to the minimum quantities of the lights received by said respective polarized light receivers; and wherein said subtractor means comprises a subtractor which generates a difference signal corresponding to the difference between said azimuth angles.

11. The apparatus according to claim 9 wherein: said means for controlling said azimuth angle varying means comprises a servo-system including means for comparing the quantities of the polarized lights received by said polarized light receivers respectively with the same reference value for producing a difference signal and means responsive to said difference signal for controlling said azimuth angle varying means; and wherein said subtractor means comprises a subtractor for detecting the difference between said azimuth angles.

12. The apparatus according to claim 9 wherein: said control means for said azimuth angle varying means comprises a regulator responsive to the detected azimuth angles for controlling the polarized light receivers such that the azimuth angles of the optical axes of said two light receivers are made equal to a preset angle and for fixing said azimuth angle varying means to the regulated positions; and wherein said subtractor means comprises a subtractor for detecting the difference between the quantities of the lights received by said receivers.

13. The apparatus according to claim 7 wherein said pair of optical systems are positioned above rollers for guiding said material at positions before and after oiling.

14. The apparatus according to claim 7 wherein said oiling device comprises an electrostatic oiling device and the flow quantity of atomized oil supplied to said oiling device is controlled by said oil quantity control means responsive to the output from said comparator.

15. The apparatus according to claim 7 wherein said oiling device comprises an electrostatic oiling device and the voltage impressed across the discharge electrodes of the oiling device is controlled in accordance with the output from said oil quantity control means responsive to the output from said comparator.

* * * * *

UNITED STATES PATENT OFFICE
CERTIFICATE OF CORRECTION

Patent No. 3,819,948                Dated June 25, 1974

Inventor(s) Hiroshi IIJIMA et al

It is certified that error appears in the above-identified patent and that said Letters Patent are hereby corrected as shown below:

On initial page of patent, change Assignee to:

--NIPPON KOKAN KABUSHIKI KAISHA--.

Signed and sealed this 29th day of October 1974.

(SEAL)
Attest:

McCOY M. GIBSON JR.            C. MARSHALL DANN
Attesting Officer              Commissioner of Patents